Figure 1:
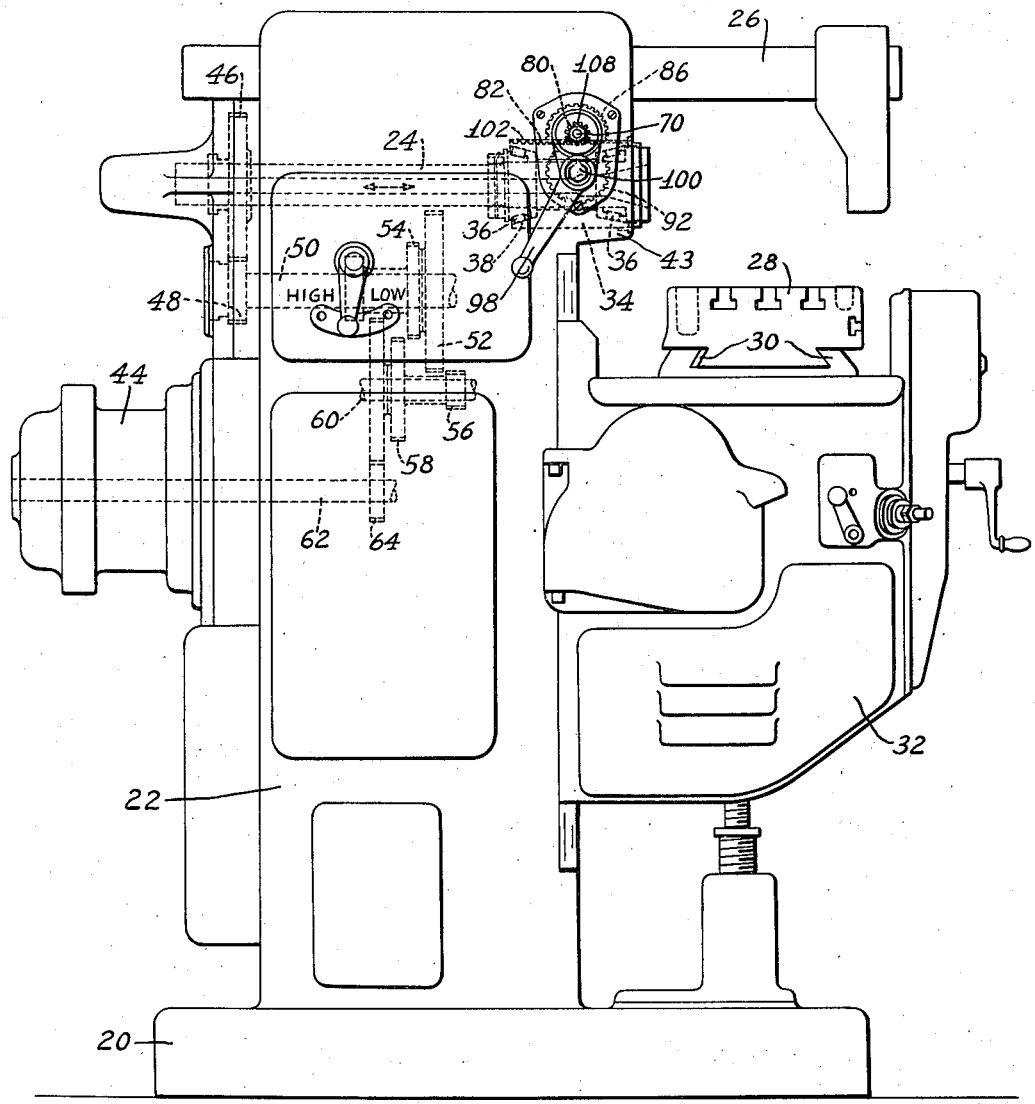

Dec. 29, 1936.　　　　G. T. MOO　　　　2,066,217

MILLING MACHINE

Filed April 11, 1935　　　2 Sheets-Sheet 1

Witness
Charles T. Olson

Inventor
Gothard T. Moo

Dec. 29, 1936. G. T. MOO 2,066,217
MILLING MACHINE
Filed April 11, 1935 2 Sheets-Sheet 2
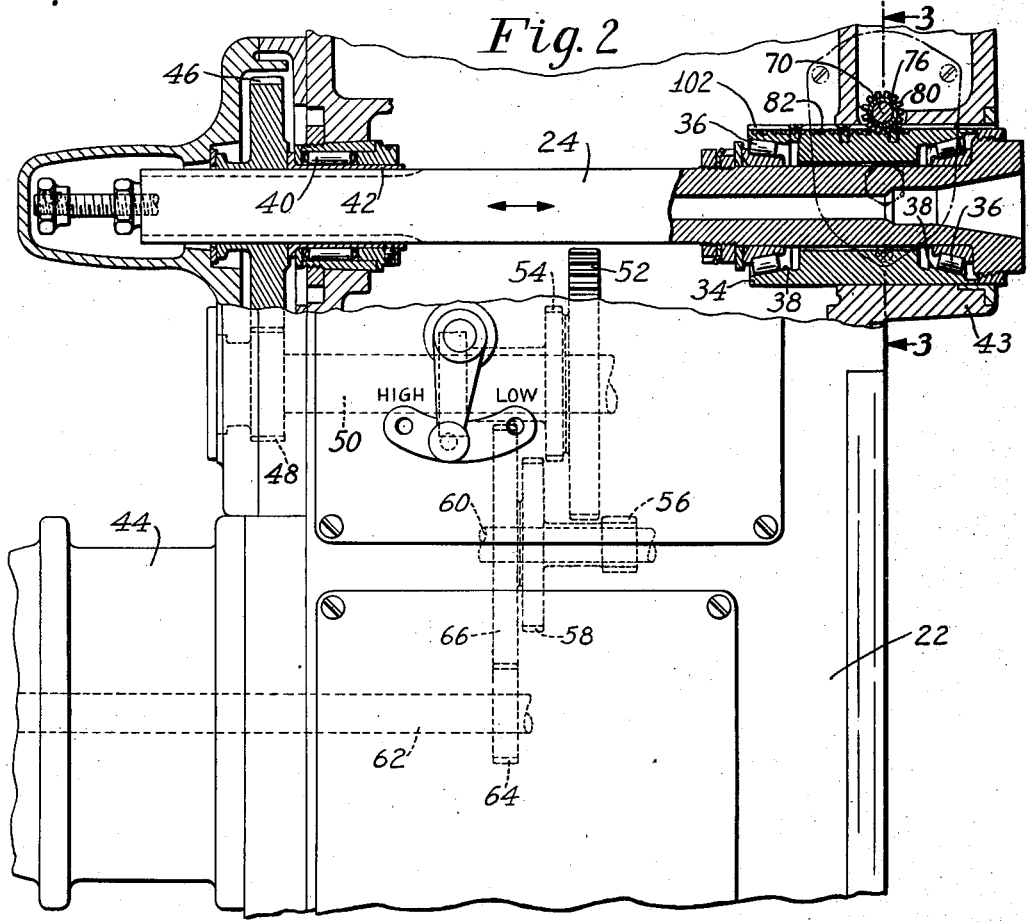
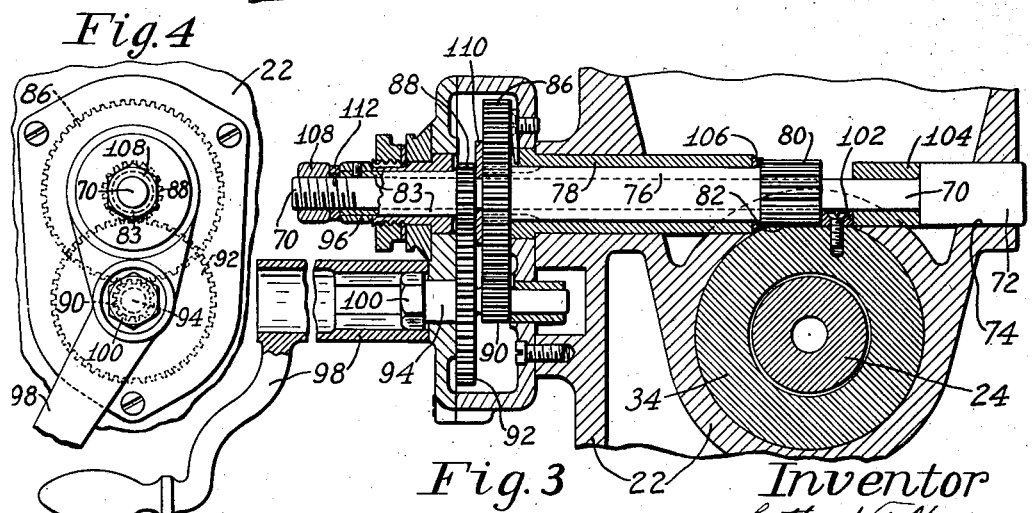
Witness
Charles T. Olson
Inventor
Gothard T. Moo
by Fish Hildreth
Cary & Jenney Attys Patented Dec. 29, 1936

2,066,217

UNITED STATES PATENT OFFICE 2,066,217

MILLING MACHINE

Gothard T. Moo, Auburn, R. I., assignor to Brown and Sharpe Manufacturing Company, a corporation of Rhode Island Application April 11, 1935, Serial No. 15,759

10 Claims. (Cl. 90—16)

The present invention relates to improvements in milling machines, and more particularly to means for effecting an axial adjustment of the milling cutter spindle and cutter associated therewith, and for clamping the spindle in adjusted position.

It is a principal object of the present invention to provide a novel and improved mechanism which is simple and compact in construction and is well adapted for enabling the operator quickly and accurately to adjust the position of the cutter spindle longitudinally, and thereafter to clamp the spindle in adjusted position.

It is a further object of the invention to provide novel and improved means for supporting and adjusting axially the cutter spindle and cutter associated therewith which is well arranged to provide a support of maximum strength and rigidity for the cutter in adjusted position.

With these and other objects in view as may hereinafter appear, one feature of the invention consists in the provision of mechanism for effecting an axial adjustment of the cutter spindle including an axially movable spindle support in combination with a clamping device which is arranged to exert a clamping pressure directly upon the spindle support and upon the adjusting mechanism therefor to maintain the spindle securely in adjusted position.

A further feature of the invention consists in the provision of a combined spindle adjusting and clamping unit having co-axially mounted control elements which may be quickly and accurately manipulated by the operator with the use of a single operating member to unclamp the spindle, perform the desired adjustment, and thereafter to clamp the spindle again firmly in adjusted position.

Another feature of the invention consists in the provision of a spindle adjusting mechanism which is provided with both rough and fine adjusting elements to facilitate the work of the operator in securing a rapid and accurate adjustment of the spindle.

A further feature of the invention consists in the construction and arrangement of the adjustable spindle bearing and housing for the same to secure a compact and efficient arrangement of parts which will permit an extremely accurate adjustment thereof and will provide a rigid and stable support for the maintenance of the cutter in adjusted position.

The several features of the present invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a general side view of a plain milling machine embodying in a preferred form the several features of the present invention; Fig. 2 is an enlarged detail view in left side elevation of a portion of the machine column with a portion of the casing broken away, and showing certain parts in section to illustrate particularly the axially adjustable mounting for the cutter spindle; Fig. 3 is a sectional view taken on the line 3—3 of Fig. 2, to illustrate particularly the means for axially adjusting and clamping the spindle; and Fig. 4 is an end view looking from the left, of substantially the parts shown in Fig. 3.

The invention is herein disclosed as embodied in a plain milling machine of the type which comprises a horizontal milling cutter spindle mounted on a stationary supporting column, a longitudinally movable work table, and a vertically adjustable knee on which the table is mounted to slide. In order to permit a relative adjustment of the cutter and work transversely of the direction of table movement, means are provided for securing an axial adjustment of the cutter spindle.

In accordance with the present invention, a novel and improved mechanism is provided for the assistance of the operator in making this adjustment, which comprises a clamping shaft which extends outwardly through the side of the machine column, and has screw-threaded to its outer end a clamping nut. There are also provided loosely mounted to turn on the shaft, two sleeve members which are connected in driving relation through a set of reduction gears, one of said sleeves having formed thereon a hexagonal adjusting nut which is located immediately adjacent the clamping nut on the shaft, and is of identical size and shape, the other of said sleeves being operatively connected to impart the required axial adjusting movements to the cutter spindle. With this construction as hereinafter more fully set forth, the operator in order to effect the desired adjustment of the cutter spindle, applies a socket wrench to back off the clamping nut, then engages the wrench with the adjusting nut to effect the desired adjustment in the position of the spindle, and finally again sets up the clamping nut to clamp the parts in their adjusted position. For effecting a more rapid rough adjustment of the cutter spindle in either direction, there is provided an additional nut which may be engaged by the socket wrench after the clamping nut has been backed off to move the cutter spindle forwardly or backwardly as desired at a more rapid rate.

Referring specifically to the drawings, the milling machine illustrated comprises a base 20, a machine column 22 having supported thereon a cutter spindle 24, and a supporting overarm 26, together with a longitudinally movable work supporting table 28 which is mounted to slide in ways 30 formed on a vertically adjustable knee 32. The spindle 24 is mounted at its forward end in an axially adjustable sleeve bearing 34 which is provided at each end thereof with roller bearings 36 arranged to travel in bevelled raceways 38 rigidly mounted on the spindle 24, so that the spindle, which is freely rotatable in the bearing, is rigidly held against axial movement with relation thereto. The spindle 24 is supported at its rear end by means of a roller bearing 40 which engages a sleeve 42 splined to rotate with the spindle and supported against axial movement by abutting portions of the machine column assembly. In order to provide a support of maximum strength and rigidity for the cutting tool, and at the same time to permit an axial adjustment thereof in accordance with the requirements of the work, the sleeve bearing 34 is mounted for axial movement in an offset portion 43 of the column which extends forwardly over the knee, so that the cutter may be at all times located in close proximity to and receive the greatest possible support from the sleeve bearing 34 and the offset portion 43.

The spindle is driven from an electric motor generally indicated at 44 through driving connections which include a gear 46 keyed to the spindle 24 which is arranged to mesh with a gear 48 secured to an intermediate drive shaft 50. Also mounted on the shaft 50 are two change speed gears 52 and 54 which are keyed to turn therewith, and are arranged for movement into driving engagement respectively with gears 56 and 58 on a shaft 60 which is in turn driven from the armature shaft 62 of the motor 44 through gears 64 and 66 mounted respectively on the armature shaft and on the shaft 60.

The mechanism for adjusting the position of the cutter spindle 24 and milling cutter associated therewith axially in accordance with the requirements of the work to be operated upon, and for clamping the spindle in adjusted position, which forms specifically the subject-matter of the present invention, comprises a clamping shaft 70 disposed at right angles to the spindle 24 directly above the sleeve bearing 34 and in close proximity thereto. The shaft 70 is provided at its right hand or rear end, as shown in Fig. 3, with an enlarged portion 72 which is supported to rotate and to slide freely in a bearing support 74 formed in the casing of the machine column 22, and at its other end projects outwardly through the casing to provide convenient access for manipulation by the operator. Loosely mounted on the shaft 70 is a sleeve member 76 which is externally supported within a bushing 78 rigidly mounted in the casing, and at one end is provided with a pinion 80 arranged for engagement with a rack 82 formed on the upper side of the sleeve bearing 34. The sleeve 76 is connected through reduction gearing to a sleeve 83 also loosely mounted to turn on the clamping shaft 70 adjacent the forward or outer end thereof. The reduction gearing referred to, comprises gears 86 and 88 secured respectively to adjacent ends of the sleeves 76 and 84, and arranged to mesh with gears 90 and 92 secured to a shaft 94 rotatably supported in bearings in the machine column. A hexagonal nut 96 is rigidly secured to the outer end of the sleeve 83 adjacent the end of the clamping shaft 70 for engagement with a manually operable tool of any convenient description, which may preferably take the form of the socket wrench or handle 98 illustrated in Figs. 1 and 3, for securing the required axial adjustment of the sleeve bearing 34 through the connections above described. In order to permit a more rapid or rough adjustment of the spindle bearing 34 and spindle associated therewith, a hexagonal nut 100 is formed on the outer end of the shaft 94 for engagement by the tool 98, as illustrated in Fig. 3.

For clamping the spindle in adjusted position, there is provided a key 102 rigidly secured to the sleeve bearing 34 adjacent the rack 82, and arranged for clamping engagement between one face of the pinion 80 and a collar 104 which is fitted onto the clamping shaft 70 against the abutting shoulder of the enlarged portion 72. The opposite face of the pinion 80 is arranged for engagement against a friction surface 106 secured to the end of the stationary bushing 78 above described. The clamping shaft 70 is moved axially to the left, as shown in Fig. 3, to rigidly clamp the assembly including the pinion 80 and key 102 against movement to maintain the sleeve bearing 34 in adjusted position by means of a hexagonal clamping nut 108 which is screw-threaded to the outer end of the clamping shaft 70, and is arranged for engagement with the adjacent face of the sleeve 83 and adjusting nut 96 secured thereto. To further position the sleeves 76 and 84 against axial movement, and to provide additional frictional resistance to the relative movement of the parts in clamping position, a friction washer 110 is mounted on the shaft 70 between the gears 86 and 88 and adjacent ends of the sleeves 76 and 84, and a friction washer 112 is keyed to the shaft 70 between the nuts 108 and 96, so that the tightening of the clamping nut 108 which tends to force the clamping shaft 70 to the left and the assembly including the sleeves 76 and 83 relatively to the right, as shown in Fig. 3, will operate to securely lock the parts in position.

It will be noted that the clamping devices above set forth, are brought into clamping engagement only with the key 102 on the sleeve bearing 34, and do not otherwise exert any direct clamping pressure on this bearing. This construction has the particular advantage of insuring the efficient clamping of the spindle and spindle bearing axially in adjusted position, without at the same time having any tendency to distort the bearing or rapidly rotating spindle supported therein.

The operation of the mechanism above described for adjusting and thereafter clamping the sleeve bearing 34 and spindle 24 in adjusted position, may be described as follows:—The socket wrench or handle 98 is fitted onto the clamping nut 108, which is then backed off sufficiently to relieve the clamping strain on the parts. The wrench 98 is then further advanced into engagement with the adjusting nut 96, which can then be rotated to move the spindle bearing 34 and spindle 24 axially in either direction as desired. During the rotational movement of the adjusting nut 96, the shaft 70 is permitted to rotate with the clamping nut 108, so that no relative movement thereof will take place to further back off or to tighten up the clamping nut. If it is desired to secure a more rapid movement of the spindle 24 to its adjusted position, the wrench or handle 98 may be removed after the clamping nut 108 has been backed off, and engaged with the nut 100 to secure a rough axial adjustment of the spindle. After the sleeve bearing 34 and spindle 24 have been moved to an exactly predetermined position, the handle 98 is positioned for engagement only with the clamping nut 108 which is then set up to clamp the parts rigidly in position.

The invention having been described, what is claimed is:—

1. In a milling machine, the combination with a spindle support and a work support relatively movable to perform a milling operation upon the work, of a milling cutter spindle, a spindle bearing unit carried within said spindle support arranged to afford rotational and end thrust bearing support to the spindle, connections for adjusting axially the position of the bearing assembly and spindle and for clamping said unit in adjusted position comprising a clamping shaft extending transversely of the spindle, a clamping element thereon engaging said unit, a clamping nut screw-threaded to the shaft on the opposite side of the unit, connections for effecting an axial adjustment of said bearing unit and spindle including a manually operable adjusting element loosely sleeved on said shaft between the nut and said unit and arranged to be clamped with said unit between the nut and the clamping member in adjusted position.

2. In a milling machine, the combination with a milling cutter spindle support and a work support relatively movable for operation upon a work piece, of a rotary cutter spindle, an axially adjustable bearing unit arranged to afford rotational and end thrust bearing support for the spindle and mechanism for adjusting the position of the unit and spindle axially in its support and for clamping the spindle in adjusted position comprising a clamping shaft extending transversely of the spindle and a clamping element controlled thereby, connections including a sleeve member under the control of the operator rotatable on said shaft to effect said axial adjustment, and a clamping nut screw-threaded to the shaft for cooperation with said clamping element for clamping engagement therebetween of said connections and bearing unit controlled thereby in adjusted position.

3. In a milling machine, the combination with a milling cutter spindle support and a work support relatively movable for operation upon a work piece, of a rotary cutter spindle, an axially adjustable bearing unit arranged to afford rotational and end thrust bearing support for the spindle and mechanism for adjusting the position of the unit and spindle axially on its support and for clamping the spindle in adjusted position comprising a clamping shaft extending transversely of the spindle, a spindle unit clamping element controlled thereby, and a clamping nut screw-threaded on the shaft, connections including an adjusting nut of similar size and shape rotatably mounted on the shaft adjacent to the clamping nut and reduction gearing therefrom for effecting the axial adjustment of the spindle, and a tool arranged to be engaged by the operator with said clamping nut to back off the clamping nut, and to be engaged thereafter with the adjusting nut to adjust the position of the spindle axially.

4. In a milling machine, the combination with a spindle support and a work support relatively movable to perform a milling operation upon the work, of a milling cutter spindle, means for clamping the spindle against movement axially comprising a clamping shaft, a clamping element controlled thereby, adjusting connections including a sleeve mounted to rotate on said shaft for effecting an axial adjustment of the spindle on its support, an actuating sleeve rotatably mounted on the shaft, reduction gearing connecting the two sleeves, a manually operable element on said actuating sleeve to effect a fine adjustment of the spindle, a separate manually operable element connected to said first mentioned sleeve for effecting a rough adjustment of the spindle, and a manually operable clamping member on the shaft for moving said shaft and clamping element controlled thereby to clamp the spindle and adjusting connections therefor in adjusted position.

5. In a milling machine, the combination with a milling cutter spindle support and a work support relatively movable for operation upon a work piece, of a rotary cutter spindle, mechanism including reduction gearing and a manually operable control element connected thereto for moving the spindle axially to secure a fine adjustment thereof, a manually operable control element connected to move said spindle axially at a more rapid rate to secure a rough adjustment of the spindle, and a manually operable clamping element for clamping the spindle in adjusted position.

6. In a milling machine, the combination with a spindle support and a work support relatively movable to perform a milling operation upon the work, of a milling cutter spindle, a sleeve bearing for the spindle arranged to prevent axial movement of the spindle relatively thereto, and means for adjusting axially and clamping in adjusted position on the spindle support the bearing and spindle supported therein comprising a rack formed on the spindle bearing, a key adjacent thereto, a clamping shaft disposed at right angles to the spindle and having thereon a clamping shoulder, adjusting connections including a pinion loosely sleeved on said shaft to mesh with the rack and having one face thereof engaging the key, a friction surface on the spindle support, and means for moving said shaft axially to clamp said key and pinion engaging therewith between said shoulder and friction surface.

7. In a milling machine, the combination with a movable work support, of a machine column, a horizontal cutter spindle mounted thereon, a sleeve bearing for the spindle arranged to prevent axial movement of the spindle relatively thereto, and means for adjusting axially and clamping in adjusted position on its support the bearing and spindle supported therein comprising a rack formed on the sleeve bearing, a key adjacent thereto, a clamping shaft disposed at right angles to the spindle and having thereon a shoulder engaging said key, a friction member, a pinion loosely sleeved on the shaft to mesh with the rack and engaging between the friction member and the key, operating connections for rotating the pinion including a nut loosely sleeved on the shaft adjacent the end thereof, and a clamping nut screw-threaded to the shaft adjacent to the adjusting nut to clamp the pinion and key between the shoulder and friction surface.

8. In a milling machine, the combination with a movable work support, of a machine column, a horizontal cutter spindle mounted thereon, a sleeve bearing for the spindle arranged to prevent axial movement of the spindle relatively thereto, and means for adjusting axially and clamping in adjusted position on its support the bearing and spindle supported therein comprising a rack formed on the sleeve bearing, a key adjacent thereto, a clamping shaft disposed at right angles to the spindle and having thereon a shoulder engaging said key, a sleeve rotatably mounted on said shaft, an external support for the sleeve having a friction surface at one end thereof, a pinion secured to the sleeve to mesh with the rack between the friction surface and key, an actuating sleeve member including a manually operable control element rotatably mounted on the shaft, reduction gearing connecting the two sleeves, and a manually operable clamping member on the shaft arranged for engagement with said actuating sleeve member to clamp the pinion and key between said shoulder and friction surface.

9. In a milling machine, the combination with a longitudinally movable work table and a vertically adjustable knee on which said table is mounted to move, of a machine column having a portion thereof offset forwardly over the knee, a cutter spindle, a sleeve bearing arranged to afford rotational and end thrust bearing support for the spindle, said bearing being externally supported in said offset portion and having the spindle bearing surfaces thereof extending substantially to the face of said offset portion to provide a maximum support for the spindle, mechanism for adjusting the position of said sleeve bearing and spindle mounted therein axially in said offset portion, and a device for clamping the sleeve and associated parts in adjusted position.

10. In a milling machine, the combination with a longitudinally movable work table and a vertically adjustable knee on which the table is mounted to move, of a machine column having a portion thereof offset forwardly over the knee, a cutter spindle, a sleeve bearing arranged to afford rotational and end thrust bearing support for the spindle, said bearing being externally supported in said offset portion and having the bearing surface thereof extending substantially to the face of said offset portion to provide a maximum support for the spindle, connections for adjusting axially the position of the sleeve and spindle and for clamping said sleeve in adjusted position comprising a clamping shaft extending transversely of said sleeve, a clamping element thereon engaging said sleeve, a clamping nut screw-threaded to the shaft on the opposite side of the sleeve, and connections for effecting an axial adjustment of said sleeve and spindle including a manually operable adjusting element loosely sleeved on said shaft between the nut and the sleeve and arranged to be clamped with said sleeve between the nut and the clamping member in adjusted position.

GOTHARD T. MOO.